United States Patent [19]

Le Touche

[11] Patent Number: 5,338,177
[45] Date of Patent: Aug. 16, 1994

[54] HOT COMPACTING DEVICE FOR THE PRODUCTION OF PARTS REQUIRING SIMULTANEOUS PRESSURE AND TEMPERATURE RISES

[75] Inventor: Roger Le Touche, Ecquevilly, France

[73] Assignee: Aerospatiale Societe Nationale Industrielle, Paris, France

[21] Appl. No.: 49,025

[22] Filed: Apr. 16, 1993

[30] Foreign Application Priority Data

Apr. 22, 1992 [FR] France .................... 92 04946

[51] Int. Cl.$^5$ ............................................. B28B 21/00
[52] U.S. Cl. ...................................... 425/384; 264/313;
425/389; 425/392; 425/405.1; 425/407;
425/DIG. 119
[58] Field of Search .................. 156/285, 289, 382;
264/313, 314, 316; 425/144, 149, 170, 384, 389,
392, 405.1, 405.2, 407, 420, DIG. 119

[56] References Cited

U.S. PATENT DOCUMENTS

| | | | |
|---|---|---|---|
| 3,353,219 | 11/1967 | Snyder | 425/405.1 |
| 3,431,331 | 3/1969 | Pincus et al. | 425/405.1 |
| 4,623,419 | 11/1986 | Price | 425/389 |
| 4,880,688 | 11/1989 | Kromrey | 425/405.1 |
| 4,954,209 | 9/1990 | Baron | 156/583.1 |
| 4,983,345 | 1/1991 | Kromrey | 264/313 |
| 5,009,687 | 4/1991 | Kromrey | 65/18.1 |
| 5,084,219 | 1/1992 | Sigur | 264/313 |

FOREIGN PATENT DOCUMENTS

| | | | |
|---|---|---|---|
| 1348192 | 10/1987 | U.S.S.R. | 425/389 |
| 198869 | 6/1923 | United Kingdom | 425/389 |

*Primary Examiner*—Charles S. Bushey
*Attorney, Agent, or Firm*—Hayes, Soloway, Hennessey, Grossman & Hage

[57] ABSTRACT

A hot compacting device for producing a part, whose production requires raising the pressure and temperature simultaneously, is provided. A device made according to the present invention includes a heating mold for receiving a blank of the part to be produced and compacting element for pressing the blank against the heating mold. The compacting element includes a compacting bag for pressing the blank against the mold and an anti-convection zone for containing a pressurized fluid in the vapor state, which anti-convection zone is interposed between the compacting bag and a semi-permeable wall, which wall is impermeable to the fluid in the liquid state but is permeable thereto in the vapor state. Also provided is a supply zone for receiving the fluid in the liquid state, which supply zone is located on a side of the semi-permeable wall located opposite the anti-convection zone.

11 Claims, 3 Drawing Sheets

HOT COMPACTING DEVICE FOR THE PRODUCTION OF PARTS REQUIRING SIMULTANEOUS PRESSURE AND TEMPERATURE RISES

BACKGROUND OF THE INVENTION

1. Field of the Invention

The invention relates to a hot compacting device for use during the production of parts requiring simultaneous pressure and temperature rises, such as thermosetting or thermoplastic material parts.

2. Description of the Prior Art

The invention is advantageously applicable to the production of composite material parts incorporating a conventional organic resin matrix (phenolic or epoxy resin) or a thermoplastic resin matrix. However, the invention is not limited to this application and instead allows the production by molding of any parts simultaneously requiring a pressure and temperature rise.

Composite material parts are generally produced by molding from a blank of the part. During molding, it is necessary to apply to the blank a pressure permitting its shaping and to heat this blank in accordance with a predetermined temperature cycle, so as to permit compacting and, in certain cases, polymerization.

Most frequently, said molding operation is performed in the autoclave, which makes it possible to produce relatively large parts. For producing smaller parts, sometimes molding takes place under a press.

The evolution of the materials used in matrixes of composite materials has made it ever more frequently necessary to increase the pressure applied to the blank of the part during molding. Thus, certain thermoplastic resins must be compacted under a pressure of 50 bars and the compacting pressure of a metal matrix can be equal to or higher than 200 bars.

Under these conditions, the use of an autoclave for carrying out molding is rendered virtually impossible for safety reasons, particularly when producing large parts. Thus, an autoclave e.g. having a useful volume of approximately 1000 $m^3$, when pressurized to 50 or 20 bars constitutes a considerable hazard for the environment.

Moreover, although it is theoretically possible to carry out press molding under such pressures, this method must be abandoned when the dimensions of the parts increase, due to the overall dimensions and the considerable costs involved for the parts external of the molding equipment and making it possible to apply the pressure.

SUMMARY OF THE INVENTION

The invention relates to a hot compacting device, whose original design makes it possible to produce parts requiring simultaneous pressure and temperature rises, no matter what the dimensions of said parts and for pressure values up to and even exceeding 200 bars, without causing any special safety problems and without giving rise to any significant extra costs.

According to the invention this result is obtained by means of a hot compacting device for the production of parts requiring a simultaneous pressure and temperature rise, incorporating a heating mold able to receive a blank of the part to be produced, and compacting means able to press the blank against the heating mold, by means of a compacting bag, characterized in that the compacting means incorporate an anti-convection zone able to receive a pressurizing fluid in the vaporous state and interposed between the compacting bag and a semipermeable wall, which is impermeable to the pressurizing fluid in the liquid state and permeable to the pressurizing fluid in the vaporous state, as well as a supply zone able to receive said pressurizing fluid in the liquid state and located on a side of the wall opposite to the anti-convection zone.

In such a device, the pressure is applied to the blank by the pressurizing fluid in the state of superheated steam located in the anti-convection zone. The pressurized steam volume consequently remains low, even when the part to be produced is very large. It therefore becomes possible to attain very high compacting pressures and whilst eliminating any major industrial risk.

The anti-convection zone is filled with a porous, refractory material making it possible to avoid heat exchanges by convection. Therefore a temperature gradient in the vapour layer is obtained, which makes it possible to separately control the temperature applied to the part (which corresponds to the compacting temperature) and the pressure applied to the part (determined by the temperature at the liquid-vapour interface, i.e. at the location of the semi-permeable wall).

The semi-permeable wall and the compacting bag are substantially parallel to one another and define between them an anti-convection zone of limited thickness.

In the case where the part to be produced is shaped like a tube, the semi-permeable wall, the compacting bag and the anti-convection zone are arranged coaxially within the mold.

In order that the thickness of the pressurizing fluid in the liquid state is in contact with the semi-permeable wall is as small as possible, the supply zone is generally defined opposite to said wall by a countermold or opposite mold extending substantially parallel to said wall.

When the device is used for producing a tube, the countermold is also positioned coaxially within the mold.

In a first embodiment of the invention, the pressure applied to the part can be regulated by temperature regulating means integrated into the countermold.

In a second embodiment of the invention, optionally combined with the first, the regulation of the pressure applied to the part is ensured by a supply circuit linked with the supply zone. This circuit comprises means for circulating the pressurizing fluid in the liquid state in the supply zone, means for cooling the pressurizing fluid below its vaporization temperature and pressure measuring means acting on the means for circulating the pressurizing fluid, in order to give the desired pressure to the pressurizing fluid in the vaporous state contained in the anti-convection zone.

In order to avoid any vaporization of the pressurizing fluid outside the supply zone, the means for cooling the pressurizing fluid incorporate condensers placed at the inlet and outlet of said zone.

Advantageously, the supply circuit also comprises closing or sealing valves placed at the inlet and outlet of the supply zone and whose closure makes it possible to ensure the pressure rise at the start of the molding operation.

In addition, the demolding or mold removal of the part when the actual molding operation is ended is facilitated by providing a circuit for vacuumizing the anti-convection zone.

BRIEF DESCRIPTION OF THE DRAWINGS

The invention is described in greater detail hereinafter relative to non-limitative embodiments and with reference to the attached drawings, wherein show.

DETAILED DESCRIPTION OF PREFERRED EMBODIMENTS

Figure 1:
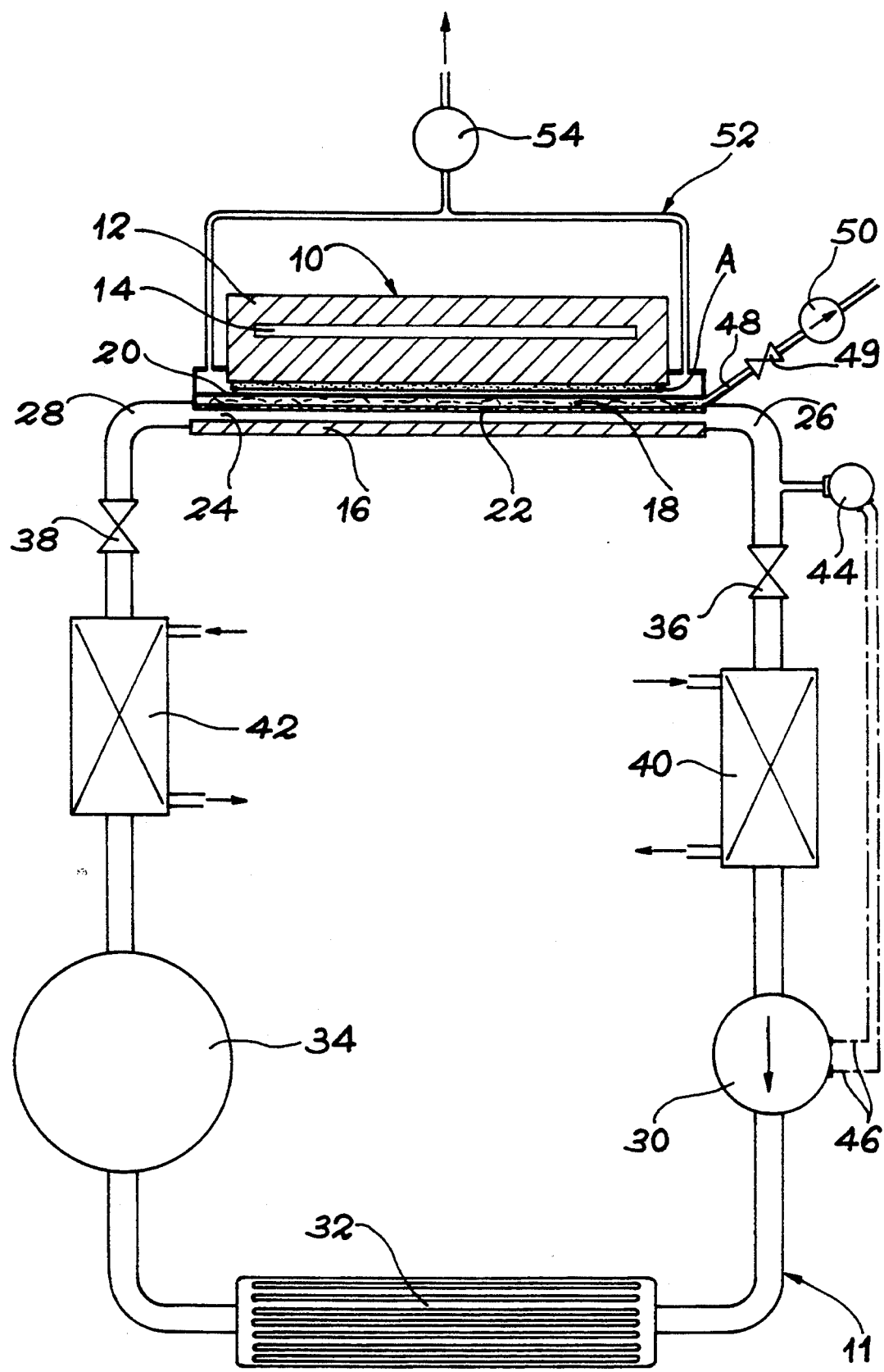
FIG. 1 Diagrammatically a hot compacting device according to the invention.

A description will be given hereinafter relative to FIG. 1 of a preferred embodiment of a hot compacting device according to the invention. This device essentially comprises a molding means designated in general terms by the reference 10 and an external supply circuit 11 making it possible to introduce into the molding means 10 a pressurizing fluid such as water, whose passage into the superheated steam state within the means 10 ensures the application of the necessary pressure for molding purposes to a blank of part A.

The different components forming the molding means 10 will now be described relative to FIG. 2. The molding means 10 comprises a heating mold 12, whose active surface 12a turned towards the bottom of FIG. 1 is complimentary with respect to the external surface of the part to be produced. This heating mold 12 is equipped with heating means such as electric heating resistors 14, whose temperature can be regulated at random. The mold 12 has mechanical characteristics enabling it to withstand the compacting pressure. If the mechanical strength of the mold heating part is inadequate for withstanding said pressure, a complimentary structure for ensuring these mechanical characteristics can be placed around the mold 12 and separated from the latter by a thermal insulant.

In most cases, with the exception of that described hereinafter relative to FIG. 5, the molding means 10 also comprises a countermold 16, whose active face 16a turned towards the mold 12, is oriented parallel to the active surface 12a of the latter. Like the mold 12, the countermold 16 is made from a material resisting the pressure produced within the molding means when using the device.

The space between the mold 12 and the countermould 16 has a constant thickness, which only very slightly exceeds (e.g. approximately 12 mm) the initial thickness of the blank of part A. Within said space, the molding means 10 essentially comprises an anti-convection or steam superheating zone 18 interposed between a impermeable compacting bag 20 on the side of the mold 12 and a semi-permeable wall 22 on the side of the countermold 16.

The anti-convection zone 18 is filled with a porous, refractory material making it possible to ensure that there are no heat exchanges by gas convection between the bag 20 and the wall 22. As a non-limitative example, said porous, refractory material can be constituted by a mixture of refractory fibres and fumed silica.

The compacting bag 20 is tightly connected to the walls 22, at the ends of the anti-convection zone 18 located beyond the active parts of the mold 12. The bag 20 can in particular be made from stainless steel. Its function is to apply to the blank of part A the compacting pressure produced in the zone 18, when the blank A is placed between the bag and the mold 12. As in conventional molding devices, the mold 12 is arranged so as to permit the putting into place of the blank A in the location in question, i.e. it can be produced in at least two portions when it has a closed shape. As a non-limitative example, the anti-convection zone 18 can have a uniform thickness of approximately 10 mm.

The semi-permeable wall 22 placed on the anti-convection zone 18 on the side of the countermold 16 is made from a material chosen in such a way as to be impermeable to the pressurizing fluid injected into the molding means 10 by the supply circuit 11, when said pressurizing fluid is in the liquid state, whilst being permeable to the same pressurizing fluid when in the vaporous state. This pressurizing fluid is advantageously constituted by water. However, in particular cases, it is also possible to choose other vaporizable liquids and in particular when the cooling of the molded part makes it necessary to drop to a temperature below 0° C.

The space separating the semi-permeable wall 22 from the countermold 16 forms a supply zone 24 with which is linked the supply circuit 11. The preferably constant thickness of said supply zone 11 can e.g. be between 1 and 3 mm. The circuit 11 makes it possible to introduce the aformentioned pressurizing fluid in the liquid state into the supply zone 24.

Figure 2:
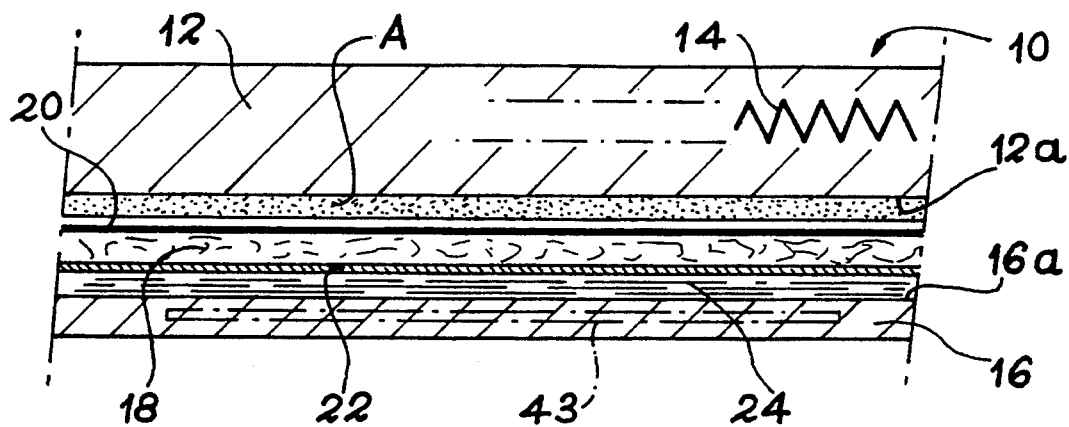
FIG. 2 A larger scale sectional view of the molding means used in the device of FIG. 1.

In the molding means 10 illustrated in FIG. 2, the active surface 12a of the mold 12, the compacting bag 20, the semi-permeable wall 22 and the active surface 16a of the countermold 10 are substantially parallel to one another.

The supply circuit 11 is geometrically positioned below the molding means 10 and is linked with the supply zone 24 by one or more intake pipes 26 and one or more discharge pipes 28. These pipes can also have very small sections (e.g. an internal diameter of 1 or 2 mm). Between the intake 26 and discharge 28 pipes, the supply circuit 11 comprises a high pressure pump 30, a radiator 32 and a high pressure tank 34 containing the pressurizing fluid quantity in the liquid state necessary for the application of the desired pressure to the blank A.

In addition, in the immediate vicinity of the molding means 10, high pressure valves 36, 38 and condensers 40, 42 are placed in the discharge pipe 28 and the intake pipe 26 respectively. The valves 36, 38 are used during molding in the manner to be described hereinafter. The condensers 40, 42 make it possible to ensure that the temperature of the pressurizing fluid in the supply circuit 11 does not exceed its vaporization point, i.e. 100° C. in the case of water. The radiator 32 optionally contributes to lowering the temperature of the pressurizing fluid below this value.

In the embodiment shown in FIG. 1, a pressure relief manometer 44 is branched into the discharge pipe 28. Said manometer is electrically connected by cables 46' to the electric control motor of the high pressure pump 30. As will be explained hereinafter, this arrangement makes it possible to regulate the pressure applied to the blank of part A, when said pressure has reached the desired value.

In another embodiment illustrated in mixed line form in FIG. 2, said pressure regulation is ensured by temperature regulating means 43, fitted in the countermold 16 and maintaining the latter at a constant temperature when the desired pressure is reached.

The hot compacting device illustrated in FIG. 1 also comprises a circuit 48 for vacuumizing the anti-convection zone 18 and which is linked with said zone and has a valve 49 and pumping means such as a vacuum pump 50. This vacuumizing circuit 48 is used during the cooling of the part following its molding, in order to speed up said cooling and facilitate demolding.

Finally, the device comprises a degassing circuit 52 (FIG. 1), which is linked with the closed space defined between the bag 20 and the mold 12. This circuit, which has pumping means such as a vacuum pump 54, ensures the degassing of the blank A during molding.

When using the hot compacting device illustrated in FIG. 1, the blank of part A is put into place by opening the mold 12, as in conventional molding devices. In the embodiment considered, water in the liquid state is then introduced into the supply zone 24, whilst closing the valve 36 and actuating the pump 30. The heating means 14 for the mold 12 are then put into operation, as is the degassing circuit 52.

On reaching the vaporization temperature of water, i.e. 100° C., the water vapour or steam formed in the supply zone 24 enters the anti-convection zone 18 through the semi-permeable wall 22. As the volume of the anti-convection zone is constant, the temperature rise within the mold leads to an increase in the pressure of the vapour layer contained in said zone. In the case of water, FIG. 3 illustrates the evolution of the absolute pressure (in bars) of the vapour contained in the anti-convection zone 18, as a function of the vaporization temperature (in °C.), i.e. the temperature at the liquid-vapour interface located on the semi-permeable wall 22.

The pressure produced in this way in the anti-convection zone 18 is applied to the blank of part A by means of the deformable bag 20. It is also transmitted to the pressurizing fluid in the liquid state contained in the supply space 24 by the semi-permeable wall 22.

Figure 3:
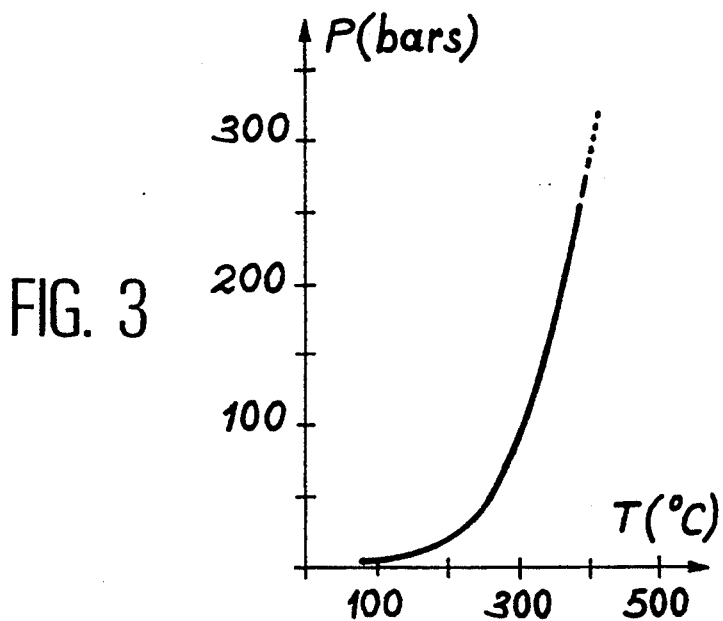
FIG. 3 In the case of water illustrates the evolution of the absolute pressure P in bars as a function of the vaporization temperature in °C.

As illustrated in FIG. 3, the higher the temperature of the semi-permeable wall 22 the faster the pressure applied increases. In particular, the increase in the pressure becomes particularly fast beyond 200° C.

As a result of the porous material contained in the anti-convection zone 18 any vapour transfer by convection between the bag 20 and the wall 22 is prevented, obviating dynamic movements of the vapour. Thus, a temperature gradient is established in said static vapour layer between the temperature reached by the compacting bag 20 heated by the mold 12 and the temperature of the semi-permeable wall 22. It is consequently possible to separately control the heating temperature of the part with the aid of heating resistors 14 integrated into the mold 12 and the pressure applied to the part, which is dependent on the temperature of the semi-permeable wall 22.

When the pressure necessary for the molding of the part is reached, it is appropriate either to start up the pressure regulating means of the supply circuit 11, or to start up the temperature regulating means 43 of the countermold 16.

In the first case, the valve 36 is opened. The pressure relief manometer 44 then controls the high pressure pump 30 as soon as the pressure exceeds a predetermined threshold. The pump 30 then injects relatively cold water into the supply zone 24 until the pressure drops below a second predetermined threshold, which has the effect of stopping the pump 30. Thus, the semi-permeable wall is kept at a vaporization temperature corresponding, on the curve of FIG. 3, to the pressure which it is desired to obtain.

In the case where the regulation of the pressure applied to the blank of part A during molding takes place by regulating the temperature of the countermold 16 by means of the regulating means 43, the temperature of the semi-permeable wall 22 is directly maintained at a vaporization temperature corresponding to the desired pressure in the anti-convection zone 18. In this case, the valves 36 and 38 can be kept closed. When the desired heating and pressure application cycle is ended, the part is cooled prior to its demolding.

Firstly said cooling is ensured by allowing the mold 12 to cool from the outside to the rigidification temperature of the matrix, when the latter is a thermoplastic resin. During this cooling, the high pressure valves 36, 38 are closed, so as to maintain a vapour pressure until the compacted material has rigidified.

This is followed by an internal cooling of the part by pressure reduction and vacuumizing of the anti-convection zone 18 by opening the valve 49 and by activating the pump 50. In view of the fact that the boiling point of water in vacuo is below 20° C., said cooling is very effective. Moreover, it makes it possible to use the thermal contraction differences for facilitating the demolding of the bag and the part produced.

In practice, the temperature and pressure reached during molding are dependent on the materials forming the blank of the part to be molded and more specifically the material constituting the matrix in the case of a composite material part.

Thus, the temperature is regulated to the necessary level for permitting compacting and, in certain cases, polymerization of the blank. This temperature is approximately 200° C. for conventional organic resins (phenolic or epoxy resins) and approximately 300° C. for thermoplastic resins of the PEEK type. Moreover, the softening point of metal matrixes is approximately 600° C. for aluminium and 900° C. for titanium.

For illustration, in the case of a material to be compacted at 600° C. under 200 bars pressure, the liquid-vapour equilibrium is established at approximately 360° C. The semi-permeable wall 22 should then be kept at 360° C. in order to obtain the desired compacting pressure of 200 bars. Simultaneously, the mold 12 is heated to 600° C.

Moreover, in the case of a material having to be compacted at 300° C. under a pressure of 50 bars, the liquid-vapour equilibrium is established at 260° C. The semi-permeable wall 22 should then be kept at 260° C. to obtain the compacting pressure of 50 bars. Simultaneously the mold 12 is heated to 300° C.

Although the hot compacting device according to the invention can be used for producing parts having very varied shapes, it is particularly suitable for the production of cylindrical or tubular parts. It is for this reason that successively a description would be given of the shape assumed by the molding means 10 when the part to be produced is a large diameter cylindrical part and when the part to be produced is a small diameter tube.

Figure 4:
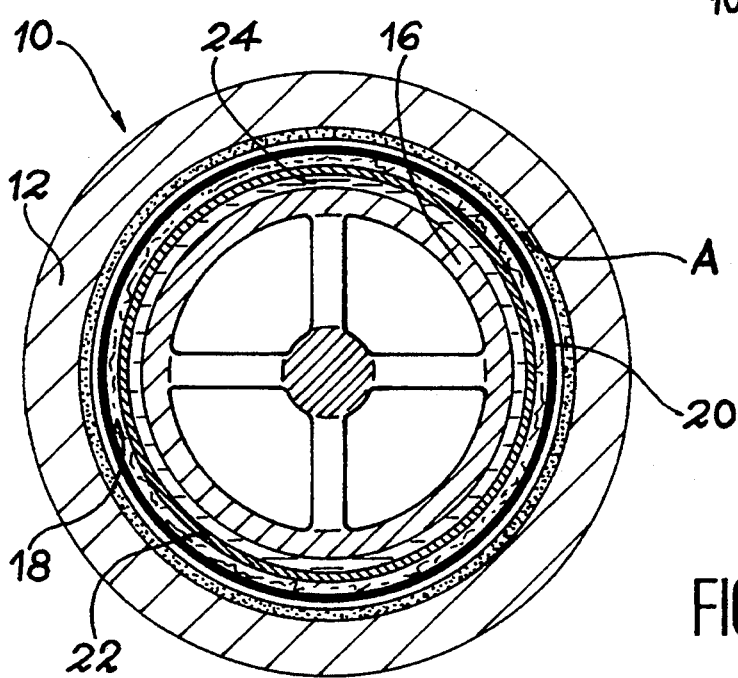
FIG. 4 A cross-sectional view illustrating the production of a large diameter, cylindrical part using the device according to the invention.

As illustrated in FIG. 4, when the molding means 10 is designed to produce a large diameter cylindrical part, the different components forming the same are arranged concentrically around a longitudinal axis. Thus, in this case the mold 12 is shaped like a cylinder and is advantageously made in two portions, in which are concentrically arranged the blank of part A, the compacting bag 20, the anti-convection zone 18, the semi-permeable wall 22, the supply zone 24 and the countermold 16. The latter is then in the form of a molding mandrel or core.

Figure 5:
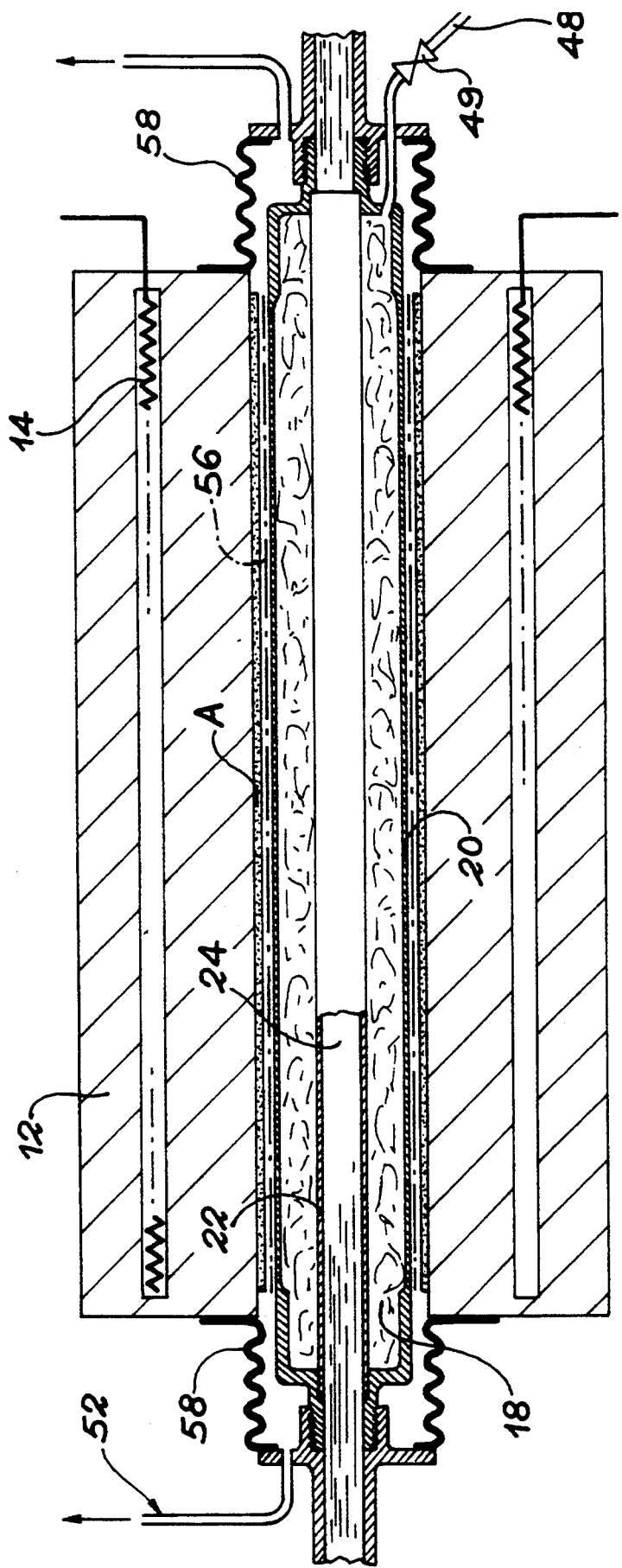
FIG. 5 A longitudinal sectional view illustrating the application of the device according to the invention to the production of a small diameter tube.

As illustrated in FIG. 5, when the molding means 10 is intended to permit the production of small diameter tubes, the mold 12 is a cylindrical mold in which are coaxially arranged in order the blank of part A, the compacting bag 20, the anti-convection zone 18, the semi-permeable wall 22 and the supply zone 24. The latter is then completely defined by the semi-tight wall 22, which is in this case in the form of a small diameter tube (e.g. 1 to 3 mm). In view of the fact that there is no countermold, the molding pressure is then controlled by means of the external supply circuit 11.

As is also illustrated in FIG. 5, it is in this case possible to place between the blank of part A and the bag 20, a tinsel sheet 56, e.g. of stainless steel, to facilitate demolding of the completed part.

FIG. 5 also shows flexible tubes 58 placed between each end of the mold 12 and the intake and discharge pipes of the supply circuit 11. These flexible tubes, e.g. made from stainless steel, ensure the sealing of the space in which is received the blank of part A, whilst still allowing differential expansions.

The hot compacting device according to the invention makes it possible to produce parts having random dimensions, limiting the compressible superheated steam volume to the small thickness anti-convection zone 18 defined between the bag 20 and the semi-permeable wall 22 positioned within the molding means 10. All the circuits located outside said means contain water in the liquid state and which is therefore incompressible, so that there is a virtually zero industrial risk, even when the compacting pressure is very high (up to approximately 200 bars).

Moreover, the obtaining of a high pressure is ensured without having to use cumbersome and costly systems outside the molding means, because the said pressure is produced within the means.

Obviously the invention is not limited to the embodiments described in exemplified manner hereinbefore and covers all variants thereof. It should in particular be noted that the shapes and sizes of the parts which can be produced with the aid of the hot compacting device according to the invention can be of a random nature. Moreover, when the molding means comprises a countermold equipped with cooling means ensuring the temperature regulation of the semi-permeable wall and consequently the compacting pressure, the filling circuit can be simplified or eliminated.

I claim:

1. A hot compacting device for production of a part requiring simultaneous pressure and temperature rises, and comprising a heating mold for receiving a blank of the part to be produced, and compacting means for pressing the blank against the heating mold by means of a compacting bag, wherein the compacting means comprises an anti-convection zone for containing a pressurizing fluid in the vapor state, interposed between the compacting bag and a semi-permeable wall which is impermeable to the fluid in the liquid state but permeable to the fluid in the vapor state, and a supply zone for receiving said fluid in the liquid state located on a side of the semi-permeable wall located opposite to said anti-convection zone.

2. A device according to claim 1, wherein the anti-convection zone is filled with a porous material.

3. A device according to claim 1, wherein the semi-permeable wall and the compacting bag are substantially parallel.

4. A device according to claim 3, wherein the part to be produced is a tube, and the semi-permeable wall, the compacting bag, and the anti-convection zone are arranged coaxially in an interior portion of the mold.

5. A device according to claim 4, wherein the supply zone is defined opposite the semi-permeable wall by a countermold extending substantially parallel to said semi-permeable wall.

6. A device according to claim 5, wherein the countermold is also positioned coaxially within the mold.

7. A device according to claim 5, wherein temperature regulating means is installed in the countermold.

8. A device according to claim 1, and further comprising a supply circuit linked with the supply zone and having means for circulating the fluid in the liquid state in the supply zone, means for cooling the fluid below its vaporization temperature, and pressure measuring means acting on the means for circulating the fluid in order to give the fluid in the vapor state contained in the anti-convection zone a given pressure.

9. A device according to claim 8, wherein the supply zone includes an inlet and outlet, and the means for cooling the fluid comprises condensers located at the inlet and outlet of the supply zone.

10. A device according to claim 8, wherein the supply zone includes an inlet and outlet, and the supply circuit also comprises closing valves placed at the inlet and outlet of the supply zone.

11. A device according to claim 1, and further comprising, a circuit for pulling a vacuum in the anti-convection zone.

* * * * *